Oct. 12, 1926.
M. H. HANBURRY
BROOM
Filed July 23, 1924
1,603,203
Fig. 1.
Fig. 2.
Fig. 3.
Fig. 4.
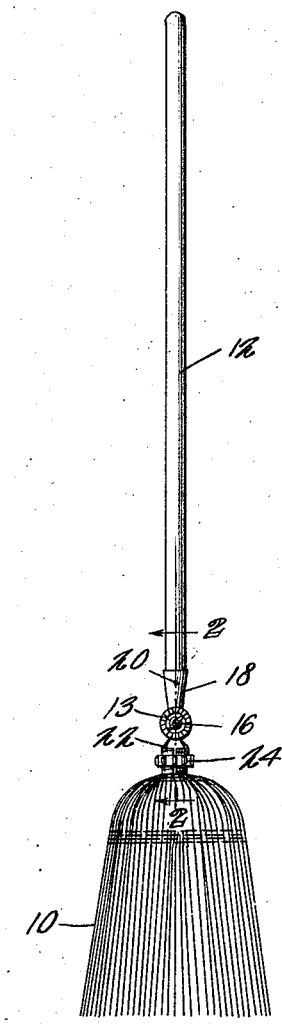
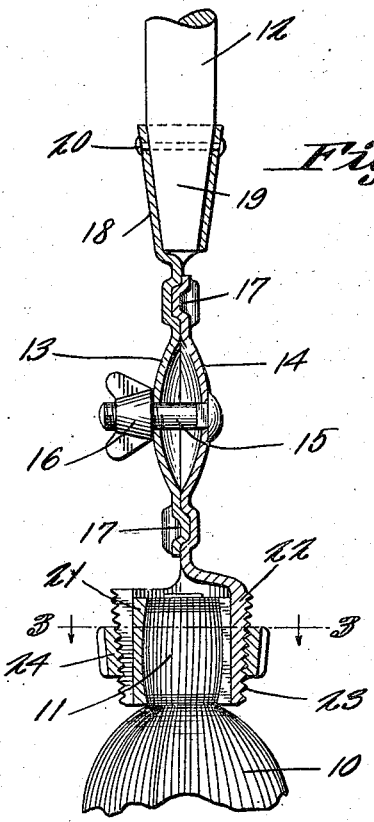
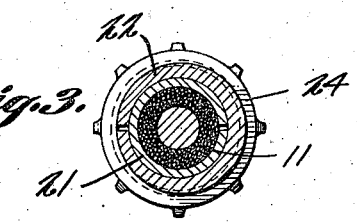
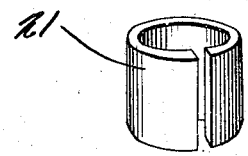
M. H. Hanburry,
INVENTOR
BY Victor J. Evans
ATTORNEY
WITNESS:

Patented Oct. 12, 1926.

1,603,203

UNITED STATES PATENT OFFICE.

MATHEW H. HANBURRY, OF DENNETT, FLORIDA.

BROOM.

Application filed July 23, 1924. Serial No. 727,761.

This invention relates to brooms and contemplates the provision of means for connecting the handle to the head of the broom in a manner whereby the handle can be arranged at any desired angle, and swung to any desired position with respect to the head of said broom, and held fixed relatively to the head so that the broom can be used and conveniently handled to sweep beneath tables, beds and the like.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:—

Figure 1 is an elevation of the broom constructed in accordance with the invention.

Figure 2 is an enlarged sectional view taken on line 2—2 of Figure 1.

Figure 3 is a sectional view taken on line 3—3 of Figure 2.

Figure 4 is a perspective view of the split resilient sleeve.

Referring to the drawing in detail 10 represents the head of a broom, and rising from this head is a short extension 11, with which the handle 12 is adapted to be connected in a manner to be presently described. If desired this extension 11 may be provided by cutting the handle at an appropriate point in its length, but in any circumstance the extension 11 is preferably shaped as shown in Figure 2.

The means employed for associating the handle with the head of the broom, and which means forms the subject matter of the present invention, allows the handle 12 to be swung upon a pivot in any direction, and arranged at any desired angle with relation to the head 10, so the broom can be conveniently used to sweep beneath beds, tables and the like, and in places brooms of ordinary construction could not be used. This means essentially consists of a pair of pivotally connected disk like members 13 and 14 respectively, these members being connected by a pivot bolt 15 which has associated therewith a thumb nut 16. Each disk is corrugated about its marginal edge as at 17 to assist in holding the disks fixed relatively after the handle 12 has been swung to its position for use. The disk 13 supports a socket member 18 which is shaped to accommodate or receive the tapered extremity 19 of the handle 12, which handle is preferably held within the socket by means of a transverse pin 20. The other disk member 14 is supported on the head of the broom in a manner whereby the disk like members can be arranged either in the position shown in Figure 1, or the position shown in Figure 2, so that the handle 12 can be swung upon its pivot in any desired direction with relation to the head 10. For this purpose I make use of a split resilient sleeve 21 which is adapted to surround the short extension 11 of the head 10, the inner surface of this sleeve being shaped to correspond to the configuration of said short extension as shown in Figure 2. Surrounding this sleeve 21 is a split annular member 22 carried by the disk 14, the split annular member being tapered as well as exteriorly threaded as at 23. A nut 24 is adapted to be threaded on the tubular member 22, and when threaded in one direction upon the tubular member clamps the latter onto the short extension 11. When the nut is moved in an opposite direction it loosens the connections between the disk like member 14 and the short extension 11 of the head 10, so that the disks 13 and 14 the handle 12 and the tubular member 23 can all be turned upon the sleeve 21 in order to arrange the disk like members 13 and 14 at a right angle to the head of the broom, in contradistinction to the position which these disks occupy in Figure 1. Consequently by reason of this construction the handle can be arranged to be swung in any direction with relation to the broom head, and also arranged at any particular angle thereto, and subsequently held fixed with relation to the head by tightening the thumb nut 16.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A broom, including a head having an extension, a handle therefor, means for supporting the handle for pivotal movement with relation to the head and including a socket member tapered toward one end and exteriorly threaded, a split sleeve adapted to surround said extension and be received by said socket member whereby the latter can be rotated with said handle to change the position of the pivot with relation to the broom head, and a nut threaded on said socket member for holding the latter and said split sleeve fixed relatively to the head.

In testimony whereof I affix my signature.

MATHEW H. HANBURRY.